United States Patent
Jones

(10) Patent No.: US 7,257,835 B2
(45) Date of Patent: Aug. 14, 2007

(54) SECURELY AUTHORIZING THE PERFORMANCE OF ACTIONS

(75) Inventor: Thomas C. Jones, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 10/448,170

(22) Filed: May 28, 2003

(65) Prior Publication Data

US 2004/0243824 A1 Dec. 2, 2004

(51) Int. Cl.
*H04L 9/00* (2006.01)
*H04L 9/32* (2006.01)

(52) U.S. Cl. ............... 726/1; 726/2; 726/4; 726/10

(58) Field of Classification Search ............... 726/1–5, 726/27–30; 713/168, 175, 189, 192–193
See application file for complete search history.

(56) References Cited

U.S. PATENT DOCUMENTS 6,565,000 B2 * 5/2003 Sehr ........................... 235/384

OTHER PUBLICATIONS

Tan, E.C., et al., "Group-Access Control of Confidential Files in E-Commerce Management Using Shared-Secret Scheme," Electronic Commerce Research, vol. 2, No. 1-2, 2002, pp. 151-158.

Hayes, J., "Policy-based Authentication and Authorization: Secure Access to the Network Infrastructure," Proceedings 16th Annual Computer Security Applications Conference, Dec. 11-15, 2000, pp. 328-333.

Pejas, J., "Active Access Policy Management in Distributed Supervisory and Control Systems," 5th National Conference on Diagonstics of Industrial Processes, Sep. 17-19, 2001, pp. 309-314 (plus English Abstract).

* cited by examiner

*Primary Examiner*—Hosuk Song
(74) *Attorney, Agent, or Firm*—Lee & Hayes, PLLC

(57) ABSTRACT

Securely authorizing the performance of actions may be enabled by linking each secure/privileged action to a requisite policy for authorizing that secure/privileged action. In a described media implementation, one or more electronically-accessible media include electronically-executable instructions that, when executed, direct an electronic device to execute operations including: receiving an action performance request that is directed to a requested action; locating an authorization policy that is associated with the requested action from among multiple authorization policies, the authorization policy indicating how performance of the requested action can be authorized; and extracting at least one rule and one or more authentication ticket requirements from the authorization policy. Example operations may further include: determining whether one or more authentication tickets have been validated in accordance with the at least one rule and/or the one or more authentication ticket requirements; and if so, authorizing performance of the requested action.

28 Claims, 4 Drawing Sheets

SECURELY AUTHORIZING THE PERFORMANCE OF ACTIONS

TECHNICAL FIELD

This disclosure relates in general to securely authorizing the performance of actions and in particular, by way of example but not limitation, to securely authorizing the performance of actions using an agent that consults an authorization policy for a particular action responsive to a request to perform the particular action. The agent may be capable of pursuing acquisition of one or more authentication tickets as indicated in the authorization policy for the particular action.

BACKGROUND

Computers are utilized in personal, business, governmental, and other spheres of life for a variety of purposes and situations, including those that relate to finances, entertainment, accounting, commercial transactions, legal interactions, social programs, military projects, and so forth. For any of these purposes and situations, restricted access and operational limitations may be desirable to maintain secrecy and/or to establish secure constraints on the availability of actions that may be performed using these computers.

Traditional computer security paradigms entail linking critical or sensitive actions to those entities that are authorized to perform those actions by way of an associated privilege level. For example, a person wishing to use a computer to access information and/or to perform actions typically logs in to the computer with an identifier and a password or smartcard. After successfully logging in, the computer uses the login information to establish what rights the person has based on the login information.

Once logged in, the person can attempt to utilize any rights that might be available from that computer. For example, if the person's login information indicates that the person has a right to perform an action, then the computer grants the person the ability to perform that action. However, if the person's login information and any pre-existing authorization rules associated therewith do not indicate that the person has such rights, then the computer denies the person the ability to perform that action.

Unfortunately, the computer lacks any knowledge on what person and/or which procedure is capable of authorizing the performance of a given action. The computer therefore does not and can not provide the requesting person with any help with respect to pursuing the right or ability to perform the requested action. Consequently, the person is completely barred from legitimately having the computer perform the action.

Accordingly, there is a need for schemes and/or techniques for enabling the performance of actions in a secure environment even when the would-be performer is unaware of the privilege or privileges that are required to perform the actions.

SUMMARY

Securely authorizing the performance of actions may be enabled by linking each secure/privileged action to a requisite policy for authorizing that secure/privileged action. A described database on one or more electronically-accessible media includes: multiple entries that are each directed to an authorization policy, each authorization policy associated with at least one action of multiple actions; each entry of the multiple entries including at least one rule that stipulates how the authorization policy to which the entry is directed may be satisfied, the at least one rule including one or more authentication ticket requirements; and wherein the database may be searched at least by the actions of the multiple actions.

A described system for securely authorizing the performance of actions includes: one or more agents that are capable of receiving multiple action performance requests; the one or more agents adapted to consult multiple authorization policies, each authorization policy of the multiple authorization policies associated with at least one action and indicating how performance of the at least one action can be authorized; the one or more agents configured to pursue authorization for the multiple action performance requests.

In a described media implementation, one or more electronically-accessible media include electronically-executable instructions that, when executed, direct an electronic device to execute operations including: receiving an action performance request that is directed to a requested action; locating an authorization policy that is associated with the requested action from among multiple authorization policies, the authorization policy indicating how performance of the requested action can be authorized; and extracting at least one rule and one or more authentication ticket requirements from the authorization policy that is associated with the requested action.

In an alternative described media implementation, the one or more electronically-accessible media may include additional electronically-executable instructions that, when executed, direct the electronic device to execute further operations comprising: analyzing the at least one rule from the authorization policy that is associated with the requested action; and submitting one or more authentication ticket requests based on at least a portion of the one or more authentication ticket requirements. In another alternative described media implementation, the one or more electronically-accessible media may include additional electronically-executable instructions that, when executed, direct the electronic device to execute further operations comprising: receiving one or more authentication tickets; determining whether the one or more authentication tickets have been validated in accordance with the at least one rule and/or the one or more authentication ticket requirements; and if so, authorizing performance of the requested action.

Other method, system, apparatus, database, media, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Generally, an abstract security agent may perform actions in a secure manner based on one or more rules from an authorization policy that is specific to each requested action. The abstract security agent may run with local system privilege and need not require an interactive logon. Notably, the requisite authentications for performing a requested action may be acquired by the abstract security agent after it has been invoked.

A Described Approach to Securely Authorizing the Performance of Actions

Figure 1:
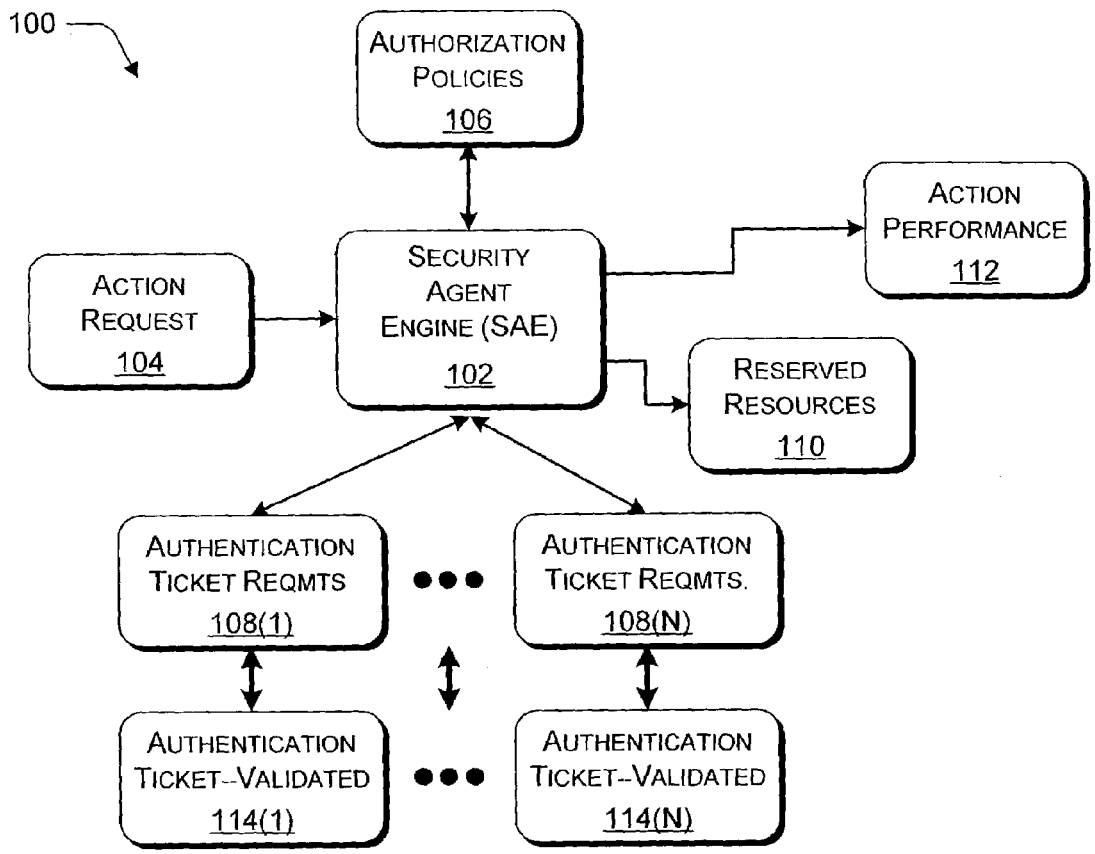
FIG. 1 illustrates an example of an approach to securely authorizing the performance of actions.

FIG. 1 illustrates an example of an approach 100 to securely authorizing the performance of actions. In a described implementation, security agent engine (SAE) 102 receives an action request 104. SAE 102, and the environment in which it operates, may be set up so that SAE 102 only receives action requests 104 for secure actions by default, or it may be set up so that SAE 102 receives all action requests 104 as a gatekeeper for the environment.

If SAE 102 receives some requests for actions for which there are no accompanying security protocols, then SAE 102 determines what type of action is being requested to determine whether or not the requested action is a secure action. This determination may be accomplished by consulting authorization policies 106 or another data structure. If the requested action is a secure action (as known either by default or by determination), SAE 102 consults authorization policies 106 with reference to the requested action. Examples of such actions are described below.

Authorization policies 106 include multiple authorization policies with each authorization policy corresponding to or associated with a particular action, or vice versa. A specific authorization policy details how the associated specific action can be authorized and allowed or enabled to occur. For example, a specific authorization policy includes one or more authentication ticket requirements 108(1) . . . 108(N). After acquisition of one or more (corresponding) validated authentication tickets 114(1) . . . 114(N), SAE 102 causes or permits the requested action to be performed. It should be noted that more than one validated authentication ticket 114 may correspond to each individual or set of authentication ticket requirement(s) 108.

SAE 102 may also ensure that sufficient resources are available to perform the action. Such resources may be necessary and/or desirable for performing the action. For example, SAE 102 may ensure that sufficient processing, memory, network, communication, etc. resources are available for performing the action. If available, SAE 102 reserves the available resources as reserved resources 110.

SAE 102 determines whether the authentication ticket requirement(s) 108 have been met. In other words, SAE 102 may determine whether the corresponding validated authentication ticket(s) 114 have been acquired. For example, SAE 102 may passively pursue validated authentication tickets 114. For instance, SAE 102 can inspect action request 104 for an authentication ticket and/or can determine a current privilege level. Alternatively, SAE 102 may actively pursue authentication tickets 114. For instance, SAE 102 can send e-mail to those who are empowered to create an authentication ticket 114. Once SAE 102 has determined that the one or more authentication tickets 114(1) . . . 114(N) have been validated, SAE 102 causes or permits the requested action to be performed as represented by action performance 112.

A Described Method for Securely Authorizing the Performance of Actions

Figure 2:
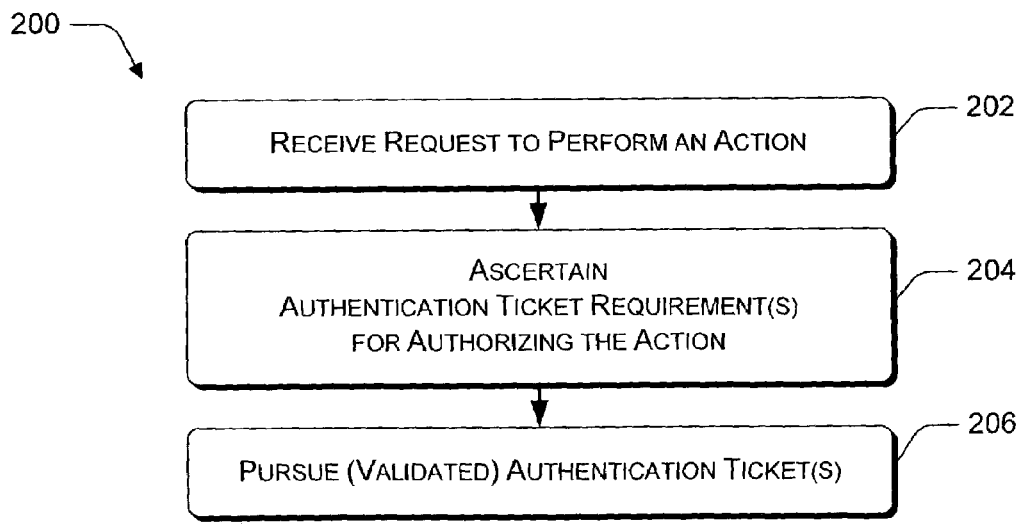
FIG. 2 is a flow diagram that illustrates an example of a method for securely authorizing the performance of actions.

FIG. 2 is a flow diagram 200 that illustrates an example of a method for securely authorizing the performance of actions. Flow diagram 200 includes three (3) blocks 202, 204, and 206. The operations of blocks 202, 204, and 206 may be executed by SAE 102 (of FIG. 1). At block 202, a request to perform an action is received. For example, a user of a computer may input an action request 104.

At block 204, authentication ticket requirement(s) to authorize the action are ascertained. For example, one or more authentication ticket requirements 108(1) . . . 108(N) that are associated with the requested action may be ascertained using an authorization policy of authorization policies 106 that corresponds to the requested action. At block 206, validated authentication ticket(s) are pursued. For example, SAE 102 may actively or passively pursue acquisition of one or more authentication tickets 114(1) . . . 114(N).

Acquisition of the requisite number of the one or more validated authentication tickets 114(1) . . . 114(N) authorizes the performance of the requested action that is associated with those authentication tickets 114. The requisite number may vary in dependence on a rule for authorizing the performance of the requested action. Rules and their relationship to authentication tickets 114 with respect to authentication ticket requirements 108 are addressed further below with reference to an action-authorization policies database of FIG. 3.

A Described Authorization Policies Database

Figure 3:
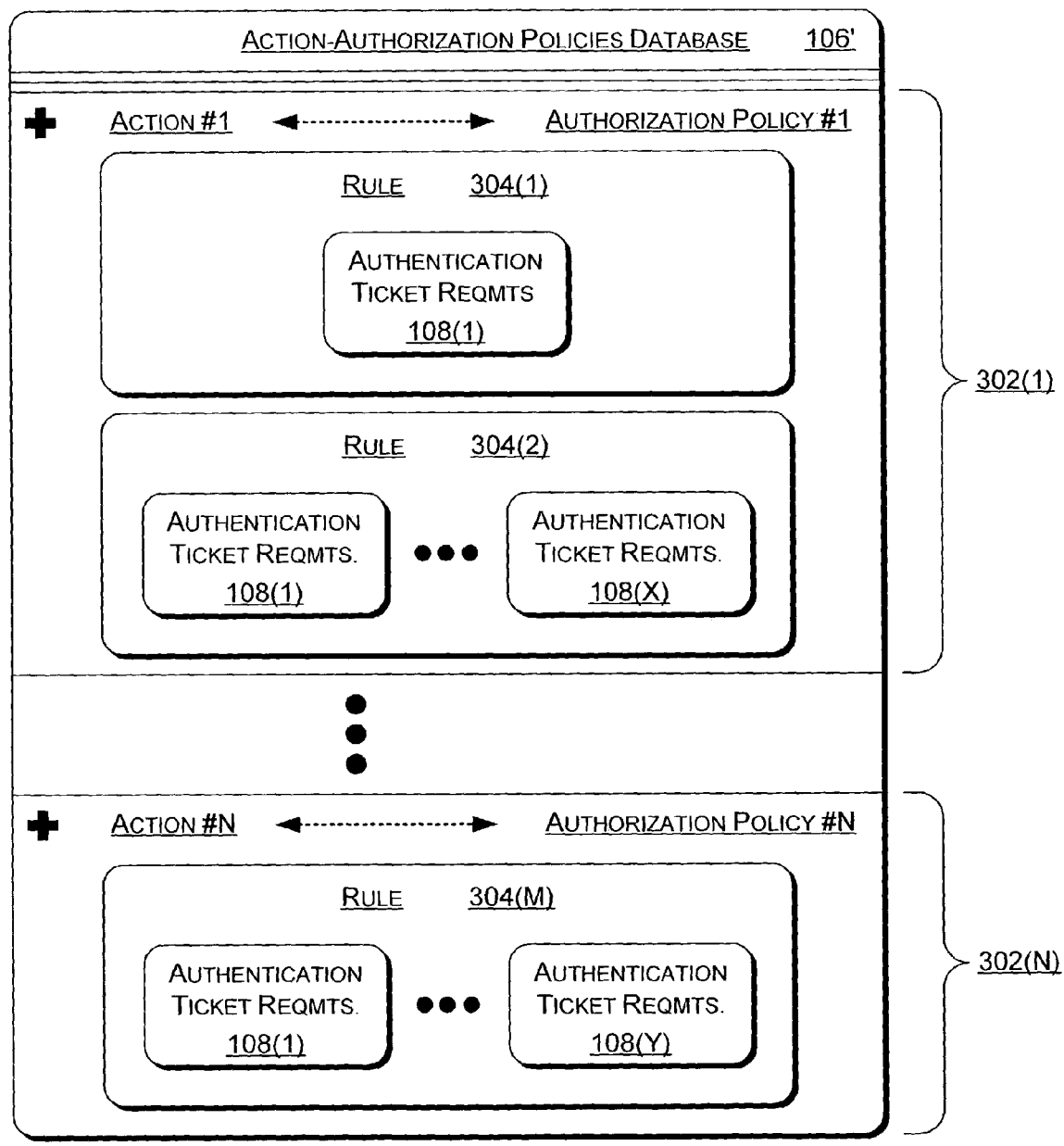
FIG. 3 is an example of an action-authorization policies database.

FIG. 3 is an example of an action-authorization policies database 106'. In a described implementation, action-authorization policies database 106' is an example of an implementation of authorization policies 106. As illustrated, action-authorization policies database 106' includes a number of entries 302(1) . . . 302(N). Each entry 302(1) . . . 302(N) includes an authorization policy #1 . . . #N. These authorization policies #1 . . . #N each correspond to an action #1 . . . #N, respectively, and vice versa.

Although not so explicitly illustrated, a given authorization policy may be associated with more than a single action. Thus, the same level and type of authorization to approve the performance of an action #C (not explicitly shown) may be required as for that to approve the performance of an action #F (also not explicitly shown). In such situations, a single authorization policy entry 302 may be associated with both of actions #F and #C, or two different action policy entries 302 may each include the same authorization policy but pertain to the different actions #F and #C.

Each entry 302, as well as the overall action-authorization policies database 106', may be considered as being directed to at least one authorization policy, as being directed to at least one associated action, or as being directed to both the requested action to-be-authorized and the associated authorization policy. Thus, each entry 302 may be termed an action entry 302, an authorization policy entry 302, an action and/or authorization policy entry 302, an action/authorization policy entry 302, and so forth. For clarity, each entry 302 is generally referenced below as authorization policy entry 302, or simply as entry 302.

Each action and/or authorization policy entry 302, and hence the corresponding authorization policy and/or action, includes at least one rule 304. For example, entry 302(1) includes rules 304(1) and 304(2), and entry 302(N) includes rule 304(M). Although no authorization policy entry 302 is illustrated as having more than two rules 304, each authorization policy entry 302 may actually have as many rules 304 as desired and/or as advisable for a given security situation.

Rules 304 stipulate how a given authorization policy can be satisfied. For example, each rule 304 stipulates a route that may be followed in order to conform to the rule. General examples are provided immediately below and specific, more-detailed examples are provided below in the section on example scenarios. Each of rules 304 include one or more authentication ticket requirements 108(1) . . . 108(N). For example, rule 304(1) includes a single authentication ticket requirement 108(1), but rule 304(2) and rule 304(M) include multiple authentication ticket requirements 108(1) . . . 108(X) and authentication ticket requirements 108(1) . . . 108(Y), respectively.

Each individual rule 304 stipulates which subset (or whether all) of the included authentication ticket requirements 108 need to be met in order to comply with that individual rule 304. For example, a rule 304(2) may stipulate that SAE 102 (of FIG. 1) is to send out nine e-mails to nine assistant administrators as indicated by nine authentication ticket requirements 108(1) . . . 108(9). It may further stipulate that if six or more corresponding validated authentication tickets 114 are returned, then rule 304(2) is complied with and the authorization policy #1 is satisfied. Performance of the associated action #1 can thus be authorized under rule 304(2).

Also, a rule 304(1) may stipulate that SAE 102 is to send out one e-mail to one full administrator as indicated by one authentication ticket 108(1) and that if a corresponding authentication ticket 114(1) is returned as validated, then rule 304(1) is complied with and the authorization policy #1 is satisfied. In this example, complying with either of rule 304(1) or rule 304(2) (or both) satisfies authorization policy #1 and can thus authorize the performance of the associated action #1.

Regardless of the specific illustrations (e.g., of FIGS. 1 and 3) and the described implementations, it should be understood that an authorization policy entry 302 may have one or more rules 304. Further, each rule 304 may stipulate one or more individual or sets of authentication ticket requirements 108. Additionally, each individual or set of authentication ticket requirements 108 may correspond to one or more than one validated authentication ticket 114. Consequently, for a given authentication ticket requirement(s) 108, one or more indicated requirements may be met prior to acquiring a corresponding validated authentication ticket 114.

A Described Process for Securely Authorizing the Performance of Actions

Figure 4:
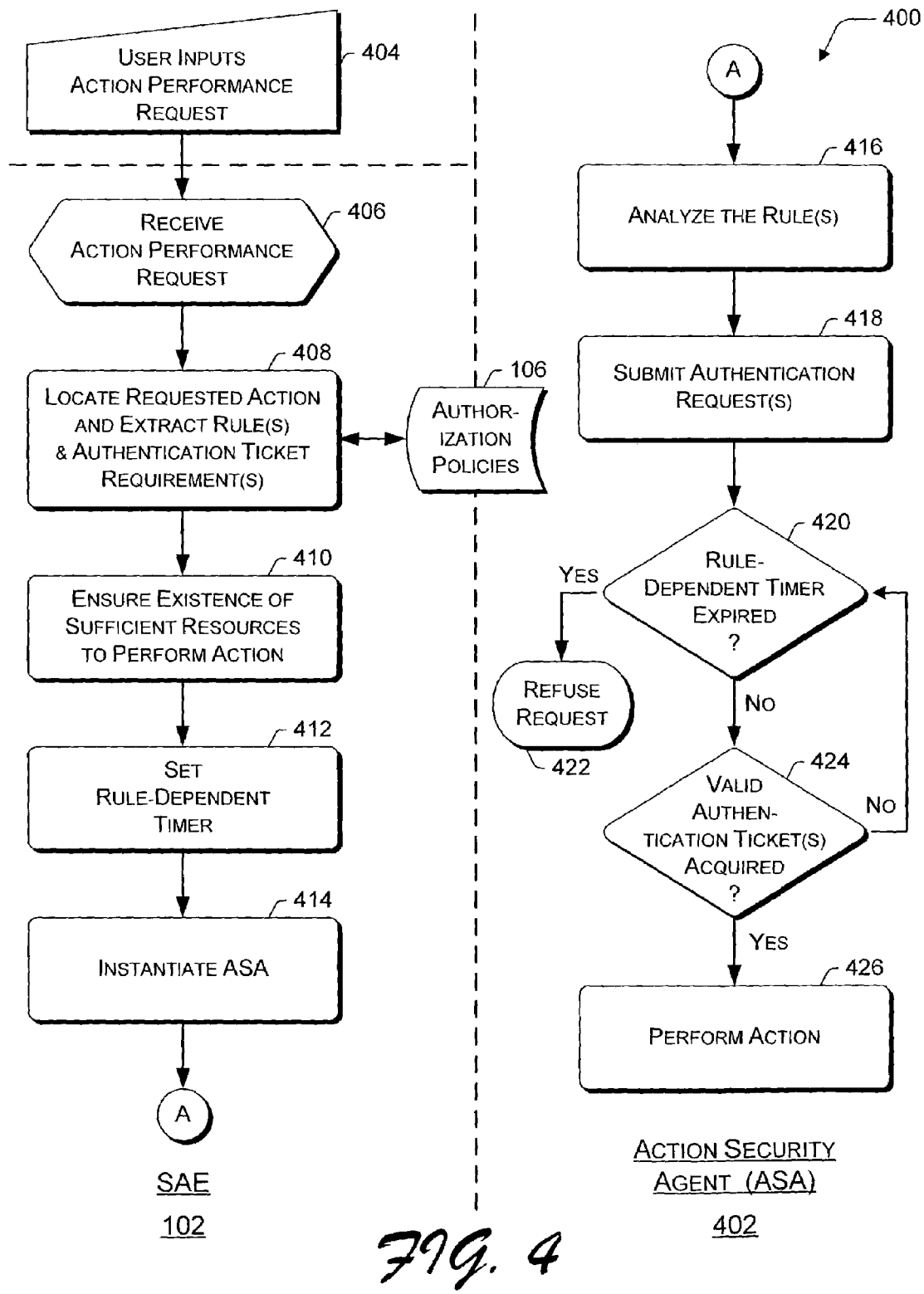
FIG. 4 is a flow diagram that illustrates an example of a process for securely authorizing the performance of actions.

FIG. 4 is a flow diagram 400 that illustrates an example of a process for securely authorizing the performance of actions. Flow diagram 400 includes twelve (12) blocks 404-426. The operations of blocks 404-426 may be executed by and/or in conjunction with an electronic device, such as those described further below with particular reference to FIG. 5. By way of example but not limitation, examples of electronic devices include server computers, desktop computers, laptop computers, hand-held computers, personal digital assistants (PDAs), mobile phones, dedicated game machines, and so forth.

Flow diagram 400 is divided into three portions in addition to authorization policies 106. Two of these three portions are SAE 102 (of FIG. 1) and an action security agent (ASA) 402. The operations of the five (5) blocks 406-414 may be executed by SAE 102, and the operations of the six (6) blocks 416-426 may be executed by ASA 402. ASA 402, as described further below with particular reference to block 414, is a specific instantiation of SAE 102 that is created to handle each request to perform an action.

The third portion of the three portions of flow diagram 400 corresponds to block 404. Block 404 represents user input for an action performance request. For example, action performance request 104 may be input into an electronic device using any input device, such as a keyboard, a mouse, a touch screen, a microphone and voice recognition program, and so forth.

At block 406, the action performance request is received. For example, SAE 102 may receive the action performance request and isolate the requested action therefrom. For block 408, authorization policies 106 are accessed. Authorization policies 106 may be realized in any database form, including any general data structure form. For example, authorization policies 106 may be implemented as an action-authorization policies database 106' (of FIG. 3).

At block 408, the requested action is located, and the rule(s) that are associated with the requested action are extracted. The requirement(s) to be met, with respect to the extracted rule(s), in order to acquire validated authentication tickets are likewise extracted. For example, an action-authorization policies database 106' is accessed at an authorization policy entry 302 for the requested action. From authorization policy entry 302, one or more rules 304 are extracted, along with their authentication ticket requirement(s) 108(1) . . . 108(N).

At block 410, the existence of currently-available resources that are sufficient to perform the action is ensured. For example, SAE 102 may determine that sufficient resources are currently available and then reserve such resources (e.g., as reserved resources 110). At block 412, a rule-dependent timer is set. For example, SAE 102 may start a count-down timer of a length that is stipulated by a rule 304. With reference to the example described above involving one full administrator and nine assistant administrators, rule 304(2) may stipulate that the requisite six validated authentication tickets 114 need to be received within 30 minutes. In this case, a second rule-dependent timer for rule 304(1) may also be started.

At block 414, an ASA that is to tend to the action performance request is instantiated. For example, SAE 102 may instantiate a separate ASA 402 for handling individual action performance requests 104. Thus, a new ASA 402 may be created for each action performance request 104 that is received by SAE 102 (or at least those for which necessary or desirable resources have been reserved at block 410). ASA 402 may continue to exist until the rule-dependent timer expires or the requisite validated authentication tickets 114 are determined to have been acquired (e.g., received).

At block 416, the extracted rule(s) for the requested action are analyzed. Continuing with the current example, ASA 402 may review rule 304(1) and rule 304(2) to determine (i) that rule 304(1) is complied with if the authentication ticket requirements 108(1) are met and (ii) that rule 304(2) is complied with if at least six of the authentication ticket requirements 108(1) . . . 108(9) are met. As a corollary, rule 304(2) may explicitly or implicitly indicate that four (or more) rejections (or other eliminations of the possibility of meeting the authentication ticket requirements) indicate that rule 304(2) cannot be complied with and that ASA 402 should be canceled after action performance request 104 is refused. This cancellation may be contingent on the absence of a rule 304(1), the previous timing-out thereof, and/or a rejection by the full administrator of an authentication ticket request sent based on authentication ticket requirement(s) 108(1) of rule 304(1).

At block 418, authentication request(s) are submitted to those entity or entities that are capable of creating authentication tickets. For example, ASA 402 may send ten e-mails with requests for validated authentication tickets 114 to the one full administrator and the nine assistant administrators. Alternatively, in another situation, ASA 402 may inspect action performance request 104 for information that may relate to an authentication ticket requirement 108, submit an authentication request back to the user that input the action performance request 104, and/or review a currently-in-effect privilege level. Other manners for pursuing acquisition of validated authentication tickets 114 are described further below in the section directed to example scenarios.

At block 420, it is determined whether the rule-dependent timer(s) have expired. For example, it may be determined by ASA 402 whether the rule-dependent timer as set in block 412 by SAE 102 has expired. If so, the action performance request is refused at block 422. The requesting user may be notified of the failure, optionally along with a report as to the progress of the authorization process prior to the timer expiration.

If, on the other hand, the rule-dependent timer has not expired (as determined at block 420), whether the requisite validated authentication ticket(s) have been acquired is determined at block 424. As described above, the required number and type of validation(s) for authentication tickets 114 is stipulated in the corresponding rule 304. If the requisite validated authentication ticket(s) have not been acquired, then the process of flow diagram 400 continues again at block 420 with an examination of the rule-dependent timer or timers.

If, on the other hand, the requisite validated authentication ticket(s) have been acquired (as determined at block 424), the requested action is authorized and performed at block 426. Although the requested action may be directly performed by ASA 402, the requested action may alternatively be indirectly performed by ASA 402. Thus, in either case, ASA 402 may cause or otherwise enable/permit the performance of the requested action once it has been authorized in accordance with its associated authorization policy.

The direct or indirect performance of the authorized action (at block 426) may alternatively be accomplished by SAE 102 and/or ASA 402 in conjunction with SAE 102. Furthermore, the operations of flow diagram 400 may be executed by a single agent, by two agents as described above, by more than two different agents, with the operations distributed differently between any two or more agents, and so forth. For example, the operation of analyzing the rule(s) (for block 416) may be executed by SAE 102 instead of ASA 402.

Either or both of SAE 102 and ASA 402 may also maintain an audit log that covers secure actions and successful and unsuccessful requests to perform them. Such an audit log may memorialize each instance of receipt of an action performance request. In addition to the requested action, each logged instance may include one or more of: the requesting user, the progress of the authorization process (e.g., which if any authentication ticket requirements were met as evidenced by acquisition of validated authentication tickets), the ultimate authorization or refusal of the action performance request, and so forth. The audit log may be accessible by an administrator in a networked environment, by a highly-privileged user in a local environment, and so forth. Furthermore, the audit log may also be automatically provided to the administrator, the highly-privileged user, etc. by way of an e-mail, a pop-up window, and so forth.

A Described Computing Operating Environment

Figure 5:
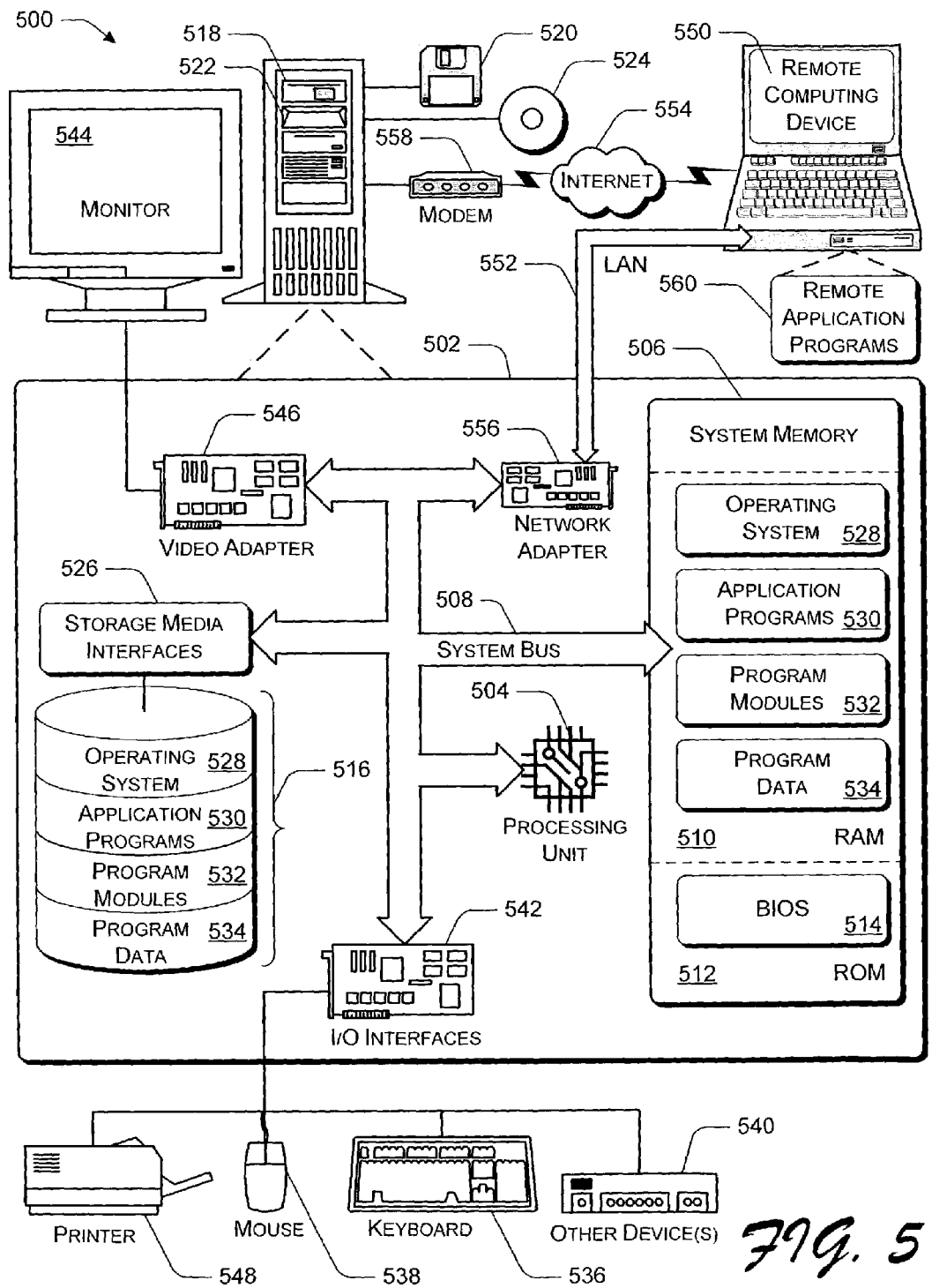
FIG. 5 illustrates an example of a computing operating environment that is capable of (wholly or partially) implementing at least one aspect of securely authorizing the performance of actions as described herein.

FIG. 5 illustrates an example of a computing operating environment 500 that is capable of (fully or partially) implementing at least one system, device, component, approach, method, process, some combination thereof, etc. for facilitating the secure authorization of the performance of actions as described herein. Computing environment 500 may be utilized in the computer and network architectures described below.

The described computing operating environment 500 is only one example of a computing environment and is not intended to suggest any limitation as to the scope of use or functionality of the applicable computer (including client/server or portable device) architectures and distributed network architectures. Neither should computing environment 500 be interpreted as having any dependency or requirement relating to any one or any combination of components as illustrated in FIG. 5.

Additionally, securely authorizing the performance of actions may be implemented with numerous other general purpose or special purpose computing system environments or configurations. Examples of well known computing systems, environments, and/or configurations that may be suitable for use include, but are not limited to, personal computers, server computers, thin clients, thick clients, personal digital assistants (PDAs) or mobile telephones, hand-held or laptop devices, multiprocessor systems, microprocessor-based systems, set top boxes, programmable consumer electronics, video game machines, network PCs, minicomputers, mainframe computers, distributed computing environments that include any of the above systems or devices, some combination thereof, and so forth.

Implementations for securely authorizing the performance of actions may be described in the general context of electronically-executable instructions. Generally, electronically-executable instructions include routines, programs, objects, components, data structures, etc. that perform particular tasks or implement particular abstract data types. Facilitating the secure authorization of the performance of actions, as described in certain implementations herein, may also be practiced in distributed computing environments where tasks are performed by remotely-linked processing devices that are connected through a communications link and/or network. Especially in a distributed computing environment, electronically-executable instructions may be located in separate storage media, executed by different processors, and/or propagated over transmission media.

Computing environment 500 includes a general-purpose computing device in the form of a computer 502, which may comprise any electronic device with computing and/or processing capabilities. The components of computer 502 may include, but are not limited to, one or more processors or processing units 504, a system memory 506, and a system bus 508 that couples various system components including processor 504 to system memory 506.

System bus 508 represents one or more of any of many types of bus structures, including a memory bus or memory controller, a switching fabric, point-to-point connections, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 502 typically includes a variety of electronically-accessible media. Such media may be any available media that is accessible by computer 502 or another electronic device, and it includes both volatile and non-volatile media, removable and non-removable media, and storage and transmission media.

System memory 506 includes electronically-accessible storage media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is typically stored in ROM 512. RAM 510 typically contains data and/or program modules/instructions that are immediately accessible to and/or being presently operated on by processing unit 504.

Computer 502 may also include other removable/non-removable and/or volatile/non-volatile storage media. By way of example, FIG. 5 illustrates a hard disk drive or disk drive array 516 for reading from and writing to a (typically) non-removable, non-volatile magnetic media (not separately shown); a magnetic disk drive 518 for reading from and writing to a (typically) removable, non-volatile magnetic disk 520 (e.g., a "floppy disk"); and an optical disk drive 522 for reading from and/or writing to a (typically) removable, non-volatile optical disk 524 such as a CD-ROM, DVD-ROM, or other optical media. Hard disk drive 516, magnetic disk drive 518, and optical disk drive 522 are each connected to system bus 508 by one or more storage media interfaces 526. Alternatively, hard disk drive 516, magnetic disk drive 518, and optical disk drive 522 may be connected to system bus 508 by one or more other separate or combined interfaces (not shown).

The disk drives and their associated electronically-accessible media provide non-volatile storage of electronically-executable instructions, such as data structures, program modules, and other data for computer 502. Although example computer 502 illustrates a hard disk 516, a removable magnetic disk 520, and a removable optical disk 524, it is to be appreciated that other types of electronically-accessible media may store instructions that are accessible by an electronic device, such as magnetic cassettes or other magnetic storage devices, flash memory, CD-ROM, digital versatile disks (DVD) or other optical storage, RAM, ROM, electrically-erasable programmable read-only memories (EEPROM), and so forth. In other words, any electronically-accessible media may be utilized to realize the storage media of the example computing system and environment 500.

Any number of program modules (or other units or sets of instructions) may be stored on hard disk 516, magnetic disk 520, optical disk 524, ROM 512, and/or RAM 510, including by way of general example, an operating system 528, one or more application programs 530, other program modules 532, and program data 534. By way of specific example but not limitation, operating system 528 may include SAE 102, program modules 532 may include at least one ASA 402, and program data 534 may include an action-authorization policies database 106'. Such program data 534 may be brought, as necessary or desirable, into RAM 510 for searching or other access purposes. Also, application programs 530 may include one or more application programs that are adapted to make calls to SAE 102 when a user thereof or a service relating thereto makes a request to perform a privileged/secure action.

A user may enter commands and information into computer 502 via input devices such as a keyboard 536 and a pointing device 538 (e.g., a "mouse"). Other input devices 540 (not shown specifically) may include a microphone, joystick, game pad, satellite dish, serial port, scanner, and/or the like. These and other input devices are connected to processing unit 504 via input/output interfaces 542 that are coupled to system bus 508. However, they may instead be connected by other interface and bus structures, such as a parallel port, a game port, a universal serial bus (USB) port, an IEEE 1394 ("Firewire") interface, an IEEE 802.11 wireless interface, a Bluetooth® wireless interface, and so forth.

A monitor 544 or other type of display device may also be connected to system bus 508 via an interface, such as a video adapter 546. In addition to monitor 544, other output peripheral devices may include components such as speakers (not shown) and a printer 548, which may be connected to computer 502 via input/output interfaces 542.

Computer 502 may operate in a networked environment using logical connections to one or more remote computers, such as a remote computing device 550. By way of example, remote computing device 550 may be a personal computer, a portable computer (e.g., laptop computer, tablet computer, PDA, mobile station, etc.), a palm or pocket-sized computer, a server, a router, a network computer, a peer device, other common network node, or another computer type as listed above, and so forth. However, remote computing device 550 is illustrated as a portable computer that may include many or all of the elements and features described herein relative to computer 502.

Logical connections between computer 502 and remote computer 550 are depicted as a local area network (LAN) 552 and a general wide area network (WAN) 554. Such networking environments are commonplace in offices, enterprise-wide computer networks, intranets, the Internet, fixed and mobile telephone networks, other wireless networks, and so forth.

When implemented in a LAN networking environment, computer 502 is usually connected to LAN 552 via a network interface or adapter 556. When implemented in a WAN networking environment, computer 502 typically includes a modem 558 or other means for establishing communications over WAN 554. Modem 558, which may be internal or external to computer 502, may be connected to system bus 508 via input/output interfaces 542 or any other appropriate mechanism(s). It is to be appreciated that the illustrated network connections are examples and that other means of establishing communication link(s) between computers 502 and 550 may be employed.

In a networked environment, such as that illustrated with computing environment 500, program modules or other instructions that are depicted relative to computer 502, or portions thereof, may be fully or partially stored in a remote memory storage device. By way of example, remote application programs 560 reside on a memory device of remote computer 550. Also, for purposes of illustration, application programs 530 and other electronically-executable instructions such as operating system 528 are illustrated herein as discrete blocks, but it is recognized that such programs, components, and other instructions reside at various times in different storage components of computing device 502 (and/or remote computing device 550) and are executed by data processor(s) 504 of computer 502 (and/or those of remote computing device 550).

The methods and processes of FIGS. 2 and 4 are illustrated in flow diagrams that are divided into multiple blocks. However, the order in which the methods and processes are described is not intended to be construed as a limitation, and any number of the described blocks can be combined in any order to implement one or more methods or processes for securely authorizing the performance of actions. Furthermore, although the methods and processes are described herein with reference to the various approaches and data structures of FIGS. 1 and 3 (as well as the example system environment of FIG. 5) and other example implementations where applicable, the methods and processes can be implemented in any suitable hardware, software, firmware, or combination thereof and using any suitable client and server architectures, database configurations, agent strategies and mechanisms, and so forth.

Described Scenarios for Securely Authorizing the Performance of Actions

The scenario examples described below may be implemented using the approaches, methods, databases, processes, etc. as described herein.

Restricted Administrator Action

In an example for this scenario, a parent wishes to create an account for a five-year-old child with restricted access to adult internet sites. The parent is initially using an operating system on a home computer with a default user privilege. Previously, the parent has established a credential to elevate the privilege level as needed to a higher level such as that of an administrator.

To create the child-friendly account, the parent activates a wizard that can add or edit an account. The wizard determines that a higher level of privilege than that of a default user is required to work with accounts. The wizard therefore requests an authentication to elevate the parent's privilege level to that of administrator. For example, the wizard may ask for the parent's password, for a smart card insertion, and so forth. After successful authentication, the wizard as agent (or a separate action agent) allows the parent to view the child's current profile and to make changes to the account. When the wizard ends, the parent's administrator authentication is also terminated, and the parent reverts to the default user privilege.

User Adding New Hardware Action

Most enterprises do not allow their users to have an administrator logon, but most of the software drivers supplied with hardware require administrator privileges. With action agents, the software provided with the hardware can instantiate an action agent to install the drivers. If the action agent does not have sufficient local privileges, it sends an application request to one or more authorization authorities (AAs) for approval. The authorization can be returned automatically for enterprise standard hardware, or it can require a manual intervention/authentication. For example, the (non-administrator) user can be required to enter his/her phone number so that an administrator can call him/her to verify that the installation is approved. The administrator may then provide a validated authentication ticket for the pending action on the user's computer via an e-mail, via another electronic message type, by giving the user a code to enter, and so forth.

Verified Actions on Client Computers

A limitation that arises for any secure client/server architecture is when the server relies on a client machine for performing actions. This is especially poignant when the relying party stands to lose money if the action is not authorized or if the action is later repudiated by the user of the client machine. When the relying party can get output from an action that it understands and that is signed in a secure part of the operating system of the client machine, the relying party has a much greater assurance that the transaction is binding and enforceable.

A specific example of this scenario is when a condition is added to a certificate requiring that only private keys protected by a PIN or password can be used to sign transactions that the certificate will accept. If the private key is held in encrypted storage on a client machine with a secure action agent, the relying party can know that the user was specifically asked for the password by virtue of the condition on the certificate. The relying party can also be given additional assurance with the signed output from the action instance because the signed output can be evaluated.

Actions with Respect to Delegated Authorization

Many user message stores, such as email inboxes, require the user to be logged into a specific application in order to read or delete messages. This restriction may work well for single-modal user interfaces, such as email user agents running on a computer. However, when other modalities, such as voice access to email, are added, the voice server needs to be able to read and delete email at the user's message store. An action agent can permit the reading and deleting actions to be instigated by the voice server when it is so directed by a user that is simply using a mobile phone, so long as that mobile phone is known to be owned by the user.

Action Authentication Degradation Over Time

An action agent with reference to one or more authorization policies can apply a degradation factor (e.g., 1/e) to an approved authentication that reduces its potency when applied to specific action requests. Thus, an administrator can apply a potency measure to each action request such that more-privileged actions become harder to approve as time transpires. Optionally, different users may start at different potency values.

A Bank Teller Requires a Supervisor to Complete an Action

Assume bank tellers are authorized to issue cash or transfer funds up to $500 without supervisor approval. Whenever a bank customer requests an action that is beyond that $500 default level, a user interface actively requests approval from a supervisor. The possible supervisors are listed in an authorization policy that is associated with transactions that are greater than the $500 level. A validated authentication ticket is created to signify supervisor approval in response to a submitted authentication (ticket) request. The validated authentication ticket may be created by, for example, the insertion of a supervisor's smart card into a client machine that is being used by the bank teller and/or the supervisor.

Access to a Shared Secret Action

In an enterprise, there are few secrets that are held by only a single person. Even many of those secrets that are held by a single person may need to be recovered if the person is suddenly not able to perform his/her usual duties. An example of a shared secret in this context is an encrypted file store that is available only to members of one group in the enterprise. Using an action agent enables more than only secret creators and administrators to be able to access secrets after they are created. For example, an action agent in conjunction with an authorization policy may be used to control access to a master key under which all files are encrypted.

Split Administrator Actions

Some actions may be considered to be too sensitive or critical to permit a single administrator to perform them without additional authorization. Authorization policies for such sensitive actions may be established so that more than one administrator needs to create an authentication ticket for the authorization policy to be satisfied and for the action to proceed. For example, a rule for an authorization policy may be set up to require three administrators out of a group of 12 administrators to approve an action request before the action agent permits the action to be performed.

Two sub-scenarios are contemplated: A first is similar to the bank teller scenario from the perspective that one administrator starts an action and then requests for additional authentication tickets pop up on other administrators' (secure) desktops. Each other additional administrator can confirm approval by a process similar to a logon, by using a smart card insertion, and so forth. A second sub-scenario involves multiple administrators requesting a sensitive or critical action. When enough validated authentication tickets from different administrators have been received (and verified) at an action agent, the action is performed. In either case, contingencies for excess authentications may be instituted.

An Action for Resetting a User's Password by an Administrator

Currently, in many client/server environments, an administrator can gain complete access to a user's client machine, perform whatever actions the administrator wants, and leave the client machine in a state that the user is not the wiser. Even in cases where a password reset is required to acquire access to some of the client user's data, the password can be reset, the data removed, and the password reset again. The client user is then sent a voice mail from an administrator saying that this reset was required and that the client user will need to enter a new password at the next logon. No domain user would find this behavior to be unusual or suspicious.

There are at least two possible policies here: The first policy is similar to the split administrator case which assumes that collusion between/among administrators is very difficult to engineer. The second policy is to require the client user to approve the data access and/or password reset in addition to one administrator. Alternatively, first and second rules setting forth both the first and second policies may be established in an authorization policy directed to a data access or password reset action. In such a situation, conformance to either the first or the second rule constitutes satisfaction of the authorization policy.

Described Implementation Strategies and Mechanisms for SAEs

This section provides examples of implementation strategies and mechanisms for one or more action agents, with particular emphasis on an SAE. In this described implementation generally, the one or more action agents as described above are located in a secure space in a local system. Thus, the SAE and one or more ASAs are located in such a secure space.

More specifically, the SAE is able to respond to any correctly formatted request for action from this secure space. Each action request is eventually handled as a distinct instance of one or more transient action agents, such as the ASAs. These ASAs run to conclusion (e.g., successful authorization or time-out failure) when invoked by the SAE.

Action requests are received from a user application via a local procedure call (LPC) connection between the user application and the SAE. The SAE identifies the action requested and loads a rule set that is associated with the requested action. The SAE also checks that required resources are available. If additional authentications are needed, the SAE may use one of the more secure desktops to request authentications if the requests are local. This occurs whether the original action request is associated with a desktop or is running as a service.

The actions performed may possibly require the highest level of privilege or security on the local computer system. Furthermore, the actions may also perform such potentially dangerous acts as accepting input from other computer systems and/or interacting with the user. Because of the myriad of likely vulnerabilities, each potential interface with the SAE should be carefully analyzed and sharply circumscribed before permitting the would-be secure action request to be usable with the SAE.

In operation, a user requests an action. The action is linked to an authorization policy that includes one or more rules and at least one associated authentication ticket requirement. For some actions and/or some users, the user already has sufficient validated authentication ticket(s) for the action to be performed. When the user does not have sufficient authentication to authorize the action, the SAE can interpret the rule or rules of the authorization policy so as to prompt the user with sufficient guidance to meet the authentication ticket requirements, or warn a security authority as appropriate.

Rules of an authorization policy can stipulate a mandate to explicitly provide a user interface that shows the impact of performing the requested action to any one or more (or all) users that receive a request for an authentication ticket. The authorization policy may be located on the machine of the user and/or centrally stored on a server machine. For example, for relatively simple requests, the SAE may be able to get the authorization needed for group policy as loaded onto each machine in the domain. For relatively complex requests, on the other hand, the same interface may be used, but the action request may be directed to a remote policy controller.

The user typically requests the action via a request interface. This request interface may be designed so that it can be used either directly from a user's graphical user interface (GUI) application or from a service that has been delegated with authority to act for the user, including an abstract type of user.

When the current authorization(s) for an action request are insufficient, and the stipulations of the relevant rule so allow or mandate, the SAE (and/or an ASA) is able to throw a user interface to request sufficient validated authentication tickets that can satisfy that relevant rule of the authorization policy. A relatively simple user interface can be placed on the local user's desktop or on the local (e.g., restricted) administrator's desktop.

It should be noted, however, that the acquisition (e.g., receipt) of a requested authentication ticket need not be supplied through the user interface as thrown by the SAE (and/or the ASA). For example, the user interface can inform the user that a network administrator's creation of an authentication ticket is required. The user can opt for an "out-of-band" communications channel, like the telephone, to request the needed approval. This approval can likewise be delivered to the SAE (and/or the ASA) over any communications pipe.

With respect to audits, the SAE may be configured so that it ensures that an audit event can (and/or will) complete before an ASA is instantiated. As a consequence, no ASA need be undertaken that fails to meet the audit policy rules for the system and/or for the currently-requested action In this described implementation, an authentication is a secure communication to the one or more action agents that indicates that a specific user has been successfully identified and bound to the requested action. This binding can be implicit, for example when the user initiates the action request. This binding can also be explicit, for example when the authenticating user is shown and responds to a user interface and/or when the authenticating user sends an authentication ticket packet to an inquiring action agent. In either case, an authentication ticket implies an intention by the authenticator to authorize the requested action.

Described Implementation Strategies and Mechanisms for ASAs

This section provides examples of implementation strategies and mechanisms for one or more action agents, with particular emphasis on ASAs. In this described implementation, the ASAs are instantiated by an SAE. However, the SAE usually executes several operations before the instantiation is started or at least before it is completed.

These operations include:

1. Find a registered action code body for the requested action.
2. Find a current authorization policy for the requested action.
3. Look for any dependencies. For example, there may be other actions that are needed to be started and/or completed prior to the performance of the requested action.
4. Ensure that sufficient computing resources, including audit resources, exist to complete the requested action. This typically includes deadlock prevention.

If all of these operations are successfully executed by the SAE, a policy-dependent timer is started (usually by the SAE) to establish the time allocated (i) for satisfying the authorization policy under the guidance of the ASA and/or (ii) for starting or completing the performance of the action. If the timer expires before the ASA determines that the authorization policy for the requested action has been satisfied, the ASA terminates and returns an error result to the SAE. Each ASA instantiation is named in a manner that enables an independent user to direct an authentication to the requested action when needed.

During or after instantiation, the ASA receives the one or more rules from the authorization policy that is associated with the requested action. These rules may be received (indirectly) from the SAE or (directly) from an authorization policies store. The ASA applies these rules to determine if the action is already authorized. If not, an appropriate user interface is shown. The user interface includes the action requested, any informative explanations, and a list of the validated authentication tickets that need to be acquired in order to conform to at least one of the rules and thereby authorize the action. The ASA then sleeps until it is called again (e.g., by receipt of a validated authentication ticket) or until the timer expires.

As described further below, an ASA may be configured somewhat similarly to an object, but the ASA can be instantiated without being linked to the data contents of "the object". For example, an ASA can be instantiated to add a user to a database before a connection to that database is effected. Hence, it is apparent that there may be many reasons why an ASA can fail after it is instantiated; examples include failure by insufficient authorization, failure by the prior existence of the same user in the aforementioned database, and so forth.

Actions to be performed may be modeled in a myriad of manners, including an object model and a transaction model. With an object model, in addition to being similar to programming models that are already in wide use today, actions may use the existing desktop to display information because they are still in the client process. However, object model implementations for actions are complicated by the need to still locate part of the code in a restricted portion of the operating system. With a transaction model, on the other hand, a separate desktop can be more easily created in order to display the user interface so that the data thereof is protected from access by the user process.

Described Actions and a Described Framework for such Actions

Each secure or privileged action may be constructed of specially-designated code that is only to be executed by a local system agent such as SAE 102. As described above, this designation may be determinable by the local system agent, by any operating system-based or application-based user interface that is capable of receiving an action request, by another part of the operating system, and so forth. The secure or privileged actions may be specially-designated by being intrinsically marked at the code level, by being included in a special list or other data structure, some combination thereof, and so forth.

Examples of actions include, but are not limited to, the following:

Action=OSLogon

This action for logging into an operating system relates to a standard local system agent logon situation.

Action=Connect with Security Support Provider Interface (SSPI)

An application that connects to a resource via an SSPI may be automatically using single-sign-on functionality. Thus, the SSPI automatically retrieves a necessary credential independent of the calling application.

Action=Acquire Authorization for Service

For this action, a domain administrator wishes to bind an encrypting file system component or feature to the presence of a specific smart card. Calling this action creates a desktop where the user is requested to provide a credential. For example, the user may be asked for a specific type of smart card and the PIN to access that smart card.

For instance:

---

Struct Cred_struct [hLocalService]
Hresult = action (get_cred, "Encrypted File needs access",
Cred_struct, current_user_token).

---

Action=Certify Private Key

This action applies a certificate authority policy to assure that a private key correctly protected before the certificate is installed on a local machine. The action may also supply a verification packet that is signed by the private key and returned to the issuing certificate authority as proof that the certificate authority policy has been followed.

Action=Initiate Restricted Administrator Desktop

This action creates (or brings into focus) a desktop that allows a user to elevate a current privilege level to an administrator level in order to run applications that a restricted administrator can run and/or to perform privileged/secure actions.

Action=Override of User Privileges

This is a generic action that can be used by applications in general to force an authorization policy to be applied before an action is performed by the application. If desired, the action agent may return the authorization status (e.g., approved or not approved) to the calling application.

Action=Add/Edit User Privileges with User Interaction

This action pops a user interface on a restricted desktop to allow a standard user to elevate a current privilege level to an administrator level in order to complete a function. These functions can include resetting a password as initiated by the user, adding new hardware to the user's computer, and so forth.

Action=Add/Edit User Privileges with No User Interaction

Example situations here include remote password resets or mandated domain policy changes from one or more domain administrators.

Action=Sign with Private Key or Decrypt with Private Key

The former action (i.e., sign with private key) enables an arbitrary data value or a hash value to be signed by a user's private key. The latter action (i.e., decrypt with private key) enables an arbitrary data value to be decrypted with the user's private key.

Action=Hide/Retrieve Secret

This action enables shared secrets and the application of diverse policies on passwords used to protect secrets. For example, a password expiration policy can be set for each secret key container.

Although systems, media, methods, approaches, processes, and other implementations have been described in language specific to structural and functional features and/or flow diagrams, it is to be understood that the invention defined in the appended claims is not necessarily limited to the specific features or flow diagrams described. Rather, the specific features and flow diagrams are disclosed as example forms of implementing the claimed invention.

The invention claimed is:

1. An arrangement for authorizing the performance of actions, the arrangement comprising:
   receiving means for receiving a request to perform an action;
   ascertaining means for ascertaining one or more authentication ticket requirements that are related to authorizing performance of the action;
   pursuing means for pursuing acquisition of at least one authentication ticket corresponding to at least a portion of the one or more authentication ticket requirements; and
   data structure means for storing a database that includes a plurality of authorization policies, each authorization policy of the plurality of authorization policies associated with an action that may be requested and including at least one authentication ticket requirement that is related to authorizing performance of the action that may be requested;
   wherein the ascertaining means uses the data structure means to ascertain the one or more authentication ticket requirements that are related to authorizing performance of the action.

2. The arrangement as recited in claim 1, further comprising:
   verifying means for verifying that the at least one authentication ticket is validated; and
   enabling means for permitting or causing the action to be performed if the verifying means verifies that the at least one authentication ticket is validated.

3. The arrangement as recited in claim 1, wherein the arrangement comprises at least one computer.

4. The arrangement as recited in claim 1, wherein the arrangement comprises one or more electronically-accessible media.

5. One or more electronically-accessible media comprising a database, the database comprising:
   a plurality of entries that are each directed to an authorization policy, each authorization policy associated with at least one action of a plurality of actions; each entry of the plurality of entries including at least one rule that stipulates how the authorization policy to which the entry is directed may be satisfied, the at least one rule including one or more authentication ticket requirements; and
   wherein the database may be searched at least by the actions of the plurality of actions;
   wherein at least one entry of the plurality of entries includes a first rule and a second rule; the first rule including at least one requirement for at least one validated authentication ticket, and the second rule including at least one requirement for at least two validated authentication tickets; and
   wherein the at least one entry is directed to a particular authorization policy; and wherein the particular authorization policy may be satisfied by complying with the first rule and/or by complying with the second rule.

6. One or more electronically-accessible media comprising a database the database comprising:
   a plurality of entries that are each directed to an authorization policy, each authorization policy associated with at least one action of a plurality of actions; each entry of the plurality of entries including at least one rule that stipulates how the authorization policy to which the entry is directed may be satisfied, the at least one rule including one or more authentication ticket requirements; and
   wherein the database may be searched at least by the actions of the plurality of action;
   wherein at least one entry of the plurality of entries includes a first rule and a second rule; the first rule including at least one requirement for at least one validated authentication ticket, and the second rule including at least one requirement for at least two validated authentication tickets; and
   wherein the at least one entry is directed to a particular authorization policy; and wherein the particular authorization policy may be satisfied by acquisition of the at least one validated authentication ticket of the first rule and/or by acquisition of the at least two validated authentication tickets of the second rule.

7. One or more electronically-accessible media comprising a database, the database comprising:
   a plurality of entries that are each directed to an authorization policy, each authorization policy associated with at least one action of a plurality of actions; each entry of the plurality of entries including at least one rule that stipulates how the authorization policy to which the entry is directed may be satisfied, the at least one rule including one or more authentication ticket requirements; and wherein the database may be searched at least by the actions of the plurality of actions; and wherein at least one entry of the plurality of entries includes a first rule and a second rule; the first rule stipulating a first route that may be followed to conform thereto and thereby satisfy an authorization policy to which the at least one entry is directed, and the second rule stipulating a second route that may be followed to conform thereto and thereby satisfy the authorization policy to which the at least one entry is directed.

8. One or more electronically-accessible media comprising a database, the database comprising:
   a first entry that is directed to a first authorization policy that is associated with a first privileged action, the first entry including:
      at least one first rule that stipulates how the first authorization policy can be satisfied to ensure that the first privileged action is performed responsive to a secure authentication; and
   a second entry that is directed to a second authorization policy that is associated with a second privileged action, the second entry including:
      at least one second rule that stipulates how the second authorization policy can be satisfied to ensure that the second privileged action is performed responsive to a secure authentication;
   wherein the database is adapted to be searched with reference to a privileged action to locate an associated authorization policy; and
   wherein the second entry further includes:
      at least one third rule that stipulates how the second authorization policy can be satisfied to ensure that the second privileged action is performed responsive to a secure authentication.

9. One or more electronically-accessible media comprising a database, the database comprising:
   a first entry that is directed to a first authorization policy that is associated with a first privileged action the first entry including:
      at least one first rule that stipulates how the first authorization policy can be satisfied to ensure that the first privileged action is performed responsive to a secure authentication; and
   a second entry that is directed to a second authorization policy that is associated with a second privileged action, the second entry including:
      at least one second rule that stipulates how the second authorization policy can be satisfied to ensure that the second privileged action is performed responsive to a secure authentication;
   wherein the database is adapted to be searched with reference to a privileged action to locate an associated authorization policy; and
   wherein the at least one first rule includes one or more first authentication ticket requirements and the at least one second rule includes one or more second authentication ticket requirements.

10. A system for authorizing the performance of actions, the system comprising:
    one or more agents that are capable of receiving a plurality of action performance requests; the one or more agents to consult a plurality of authorization policies, each authorization policy of the plurality of authorization policies associated with at least one action and indicating how performance of the at least one action can be authorized; the one or more agents to pursue authorization for the plurality of action performance requests;
    wherein the one or more agents comprise a first agent and a plurality of second agents; and wherein the first agent is capable of receiving the plurality of action performance requests, and each respective second agent of the plurality of second agents is assigned to handle a respective action performance request of the plurality of action performance requests.

11. The system as recited in claim 10, wherein the one or more agents are to pursue authorization for the plurality of action performance requests by ascertaining a particular authorization policy of the plurality of authorization policies responsive to a particular action of a particular action performance request of the plurality of action performance requests, the particular action associated with the particular authorization policy.

12. The system as recited in claim 10, wherein each action is likewise associated with one or more authorization policies of the plurality of authorization policies.

13. The system as recited in claim 10, wherein the system comprises at least one electronic device.

14. The system as recited in claim 10, wherein the system comprises at least part of a network.

15. The system as recited in claim 10, wherein each of the respective second agents of the plurality of second agents is to pursue authorization for the respective action performance request of the plurality of action performance requests.

16. The system as recited in claim 10, wherein the first agent comprises a security agent engine, and the plurality of second agents comprise a plurality of action security agents.

17. The system as recited in claim 10, wherein each authorization policy of the plurality of authorization policies indicates one or more authentication ticket requirements that are related to the associated at least one action.

18. The system as recited in claim 17, wherein the associated at least one action for each authorization policy of the plurality of authorization policies is authorized when at least one validated authentication ticket corresponding to at least a subset of the one or more authentication ticket requirements is acquired.

19. The system as recited in claim 10, wherein the one or more agents are to enable the associated at least one action to be performed when performance of the associated at least one action has been authorized.

20. A system for authorizing the performance of actions, the system comprising:
    one or more agents that are capable of receiving a plurality of action performance requests; the one or more agents to consult a plurality of authorization policies, each authorization policy of the plurality of authorization policies associated with at least one action and indicating how performance of the at least one action can be authorized; the one or more agents to pursue authorization for the plurality of action performance requests;
    wherein the one or more agents are to pursue the authorization of a particular action performance request by showing a user interface to a user that input the particular action performance request, by throwing a user interface to an entity that can approve performance of an action of the particular action performance request, by sending an electronic message to an entity that can approve performance of the action of the particular action performance request, and by verifying a privilege status on at least one of a client machine of the user that input the particular action performance request and a network of the user that input the particular action performance request.

21. One or more electronically-accessible media comprising electronically-executable instructions that, when executed, direct an electronic device to execute operations comprising:
receiving an action performance request that is directed to a requested action;
locating an authorization policy that is associated with the requested action from among a plurality of authorization policies, the authorization policy indicating how performance of the requested action can be authorized;
extracting at least one rule and one or more authentication ticket requirements from the authorization policy that is associated with the requested action;
receiving one or more authentication tickets;
determining whether the one or more authentication tickets have been validated in accordance with the at least one rule and/or the one or more authentication ticket requirements;
if so, authorizing performance of the requested action; and
if not, determining whether a timer set in accordance with the at least one rule has expired; and
if the timer has not expired, repeating the operation of determining whether the one or more authentication tickets have been validated.

22. The one or more electronically-accessible media as recited in claim 21, comprising the electronically-executable instructions that, when executed, direct the electronic device to execute a further operation comprising:
instantiating an agent to handle the action performance request in accordance with the authorization policy.

23. The one or more electronically-accessible media as recited in claim 21, comprising the electronically-executable instructions that, when executed, direct the electronic device to execute a further operation comprising:
setting the timer in dependence on the at least one rule from the authorization policy that is associated with the requested action.

24. The one or more electronically-accessible media as recited in claim 21, comprising the electronically-executable instructions that, when executed, direct the electronic device to execute further operations comprising:
analyzing the at least one rule from the authorization policy that is associated with the requested action; and
submitting one or more authentication ticket requests based on at least a portion of the one or more authentication ticket requirements.

25. One or more electronically-accessible media comprising electronically-executable instructions that, when executed, direct an electronic device to execute operations comprising:
receiving an action performance request that is directed to a requested action;
locating an authorization policy that is associated with the requested action from among a plurality of authorization policies, the authorization policy indicating how performance of the requested action can be authorized;
extracting at least one rule and one or more authentication ticket requirements from the authorization policy that is associated with the requested action;
receiving one or more authentication tickets;
determining whether the one or more authentication tickets have been validated in accordance with the at least one rule and/or the one or more authentication ticket requirements; and
if so, authorizing performance of the requested action:
wherein the electronically-executable instructions comprise at least one action security agent that enables, at least in part, execution of the operations of receiving one or more authentication tickets, determining, and authorizing.

26. The one or more electronically-accessible media as recited in claim 25, wherein the electronically-executable instructions comprise a security agent engine that enables, at least in part, execution of the operations of receiving an action performance request, locating, and extracting.

27. The one or more electronically-accessible media as recited in claim 25, comprising the electronically-executable instructions that, when executed, direct the electronic device to execute further operations comprising:
ensuring that sufficient resources exist to perform the requested action; and
if so, instantiating an action security agent to handle the action performance request in accordance with the authorization policy.

28. The one or more electronically-accessible media as recited in claim 25, comprising the electronically-executable instructions that, when executed, direct the electronic device to execute further operations comprising:
setting a timer in dependence on the at least one rule from the authorization policy that is associated with the requested action;
determining whether the timer expires prior to acquisition of at least one authentication ticket corresponding to at least a portion of the one or more authentication ticket requirements in accordance with the at least one rule; and
if so, refusing the action performance request.

* * * * *